(12) United States Patent
Hofer

(10) Patent No.: US 7,579,796 B2
(45) Date of Patent: Aug. 25, 2009

(54) CONTROLLER FOR A MULTI-PHASE BRUSHLESS DC MOTOR

(75) Inventor: Richard A. Hofer, Gardner, KS (US)

(73) Assignee: Castle Creations, Inc., Olathe, KS (US)

( * ) Notice: Subject to any disclaimer, the term of this patent is extended or adjusted under 35 U.S.C. 154(b) by 0 days.

(21) Appl. No.: 12/145,351

(22) Filed: Jun. 24, 2008

(65) Prior Publication Data

US 2008/0258658 A1   Oct. 23, 2008

Related U.S. Application Data

(63) Continuation of application No. 11/463,149, filed on Aug. 8, 2006, now Pat. No. 7,400,103.

(60) Provisional application No. 60/706,316, filed on Aug. 8, 2005.

(51) Int. Cl.
*H02P 1/00* (2006.01)

(52) U.S. Cl. .................. 318/276; 318/259; 318/260; 318/263; 318/271; 318/270; 318/274

(58) Field of Classification Search .................. 318/276, 318/259, 260, 263, 271, 270, 274
See application file for complete search history.

(56) References Cited

U.S. PATENT DOCUMENTS

| | | | | |
|---|---|---|---|---|
| 5,028,852 A | * | 7/1991 | Dunfield | 318/400.33 |
| 5,033,455 A | * | 7/1991 | Eiklor et al. | 126/512 |
| 5,254,914 A | * | 10/1993 | Dunfield et al. | 318/400.34 |
| 5,294,877 A | * | 3/1994 | Cameron | 318/809 |
| 5,317,243 A | * | 5/1994 | Cameron | 318/400.35 |
| 5,517,095 A | * | 5/1996 | Carobolante et al. | 318/400.35 |
| 2007/0282461 A1 | * | 12/2007 | Harwood | 700/14 |

* cited by examiner

*Primary Examiner*—Rita Leykin
(74) *Attorney, Agent, or Firm*—Shook, Hardy & Bacon LLP

(57) ABSTRACT

Control of rotational speed of a direct current multi-phase brushless motor is provided using an apparatus and method that works at low speed but does not depend upon Hall effect sensors. An apparatus for accelerating rotation of the motor shaft has a power stage circuit coupled to a back Electromotive Force (EMF) sensor circuit and a microprocessor. The power stage pulses at a duty cycle less than 100% under control of the microprocessor. The back EMF sensor circuit measures an order with respect to voltage of at least one phase relative to one or more other phases during off-time. The microprocessor determines one or more phases to be pulsed, and the polarity of the pulses based on the measured order. A method for sustaining rotation pulses the phases, measures order with respect to voltage of at least one phase relative to one or more other phases, and updates commutation state based on the measured order. A method of accelerating rotation generates one or more power pulses, determines an order with respect to voltage of one phase relative to one or more other phases, and generates subsequent pulses on phases and with polarity determined by the measured order.

9 Claims, 4 Drawing Sheets

CONTROLLER FOR A MULTI-PHASE BRUSHLESS DC MOTOR

CROSS-REFERENCE TO RELATED APPLICATIONS

This application is a Continuation of prior application Ser. No. 11/463,149, filed Aug. 8, 2006, which is incorporated by reference herein. This application also claims the benefit of U.S. Provisional Application No. 60/706,316, filed Aug. 8, 2005.

BACKGROUND

The present invention relates to sensors for direct current (DC) motors, and, more particularly, to a sensor circuit having a comparator responsive to back Electromotive Force (EMF) signals from a multi-phase brushless DC motor.

One method known in the art to control a three-phase brushless motor is to detect the zero-crossing event between a floating or released phase of the motor and the neutral phase. When the voltage on the released phase is equal to the neutral phase, the next phase is commutated after a predetermined delay period. Each phase is in turn driven, tied to ground and released. The output of a comparator on each of the phases is used for comparison to the neutral voltage. One problem with this method is the voltage offset from one comparator to the next may be significant, especially at low voltages and in an electrically noisy environment resulting in inconsistent or ambiguous comparisons.

Other methods use relatively complex or expensive circuits to determine the phase angle of the rotor using rotor angle sensors or phase angle detectors. Additionally, from an initial position, the DC motor may not start when power is applied if the motor is aligned with the actuated phase, the motor may start in the wrong direction, or the motor may rotate too slowly resulting in insufficient back EMF for comparisons.

Accordingly, it is desirable to provide a sensor for a brushless DC motor which is reliable, simple and relatively inexpensive to produce, particularly adapted for use in radio controlled model vehicles, such as airplanes, helicopters, boats and cars, and which senses the back EMF of the DC motor.

SUMMARY

According to one aspect, the present invention is an apparatus for accelerating the rotation of a shaft of a direct current multi-phase brushless motor. A power stage is coupled to the windings of the motor and configured to pulse one or more phases at a duty cycle less than 100%. Phases are pulsed with respective voltages belonging a commutation state of a commutation sequence. A back EMF sensor circuit measures, during the off-time of the duty cycle, an indication of order with respect to voltage of a first phase of the motor with respect to one or more other phases. A microprocessor is coupled to the power stage circuit and to the back EMF sensor circuit, and determines the phases for pulsing and the polarity of the pulses to accelerate motor shaft rotation based on the measured indication of order.

According to another aspect, the present invention is a method of sustaining rotation of a shaft of a direct current multi-phase brushless motor at low revolutions per minute. One or more phases of the motor are pulsed by a duty cycle less than 100% with voltages associated with a commutation state drawn from a commutation sequence. During the off-time of the duty cycle, the voltage order of at least one phase with respect to one or more other phases is measured. The commutation state for subsequent pulsing is updated based on the measured order.

According to still another aspect, the present invention is a method of accelerating rotation of the shaft of a direct current multi-phase brushless motor. A first power pulse is generated on a first phase of the motor. After a certain time period, the order with respect to voltage of one phase is measured relative to one or more other phases. A second power pulse is generated on a second phase of the motor. The polarity of the second power pulse corresponds to the determined relative order.

Other advantages of this invention will become apparent from the following description taken in connection with the accompanying drawings, wherein is set forth by way of illustration and example, an embodiment of the present invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

The present invention includes the use of a microprocessor which performs embedded control, and thus utilizes software to implement features of the invention. The invention may be described in the general context of computer-executable instructions, such as program modules, being executed by a computer. Generally, program modules include, but are not limited to, routines, programs, objects, components, and data structures that perform particular tasks or implement particular abstract data types. As those well practiced in the art will appreciate the present invention may also be implemented using programmable logic, a hardware logic processor, state machine, or micro-sequencer. Likewise, the functions allocated to hardware may instead be implemented in software or implemented as a combination of hardware and software. Such alternatives are well within the scope of the embodiments contemplated and intended for practicing the invention.

Figure 1:
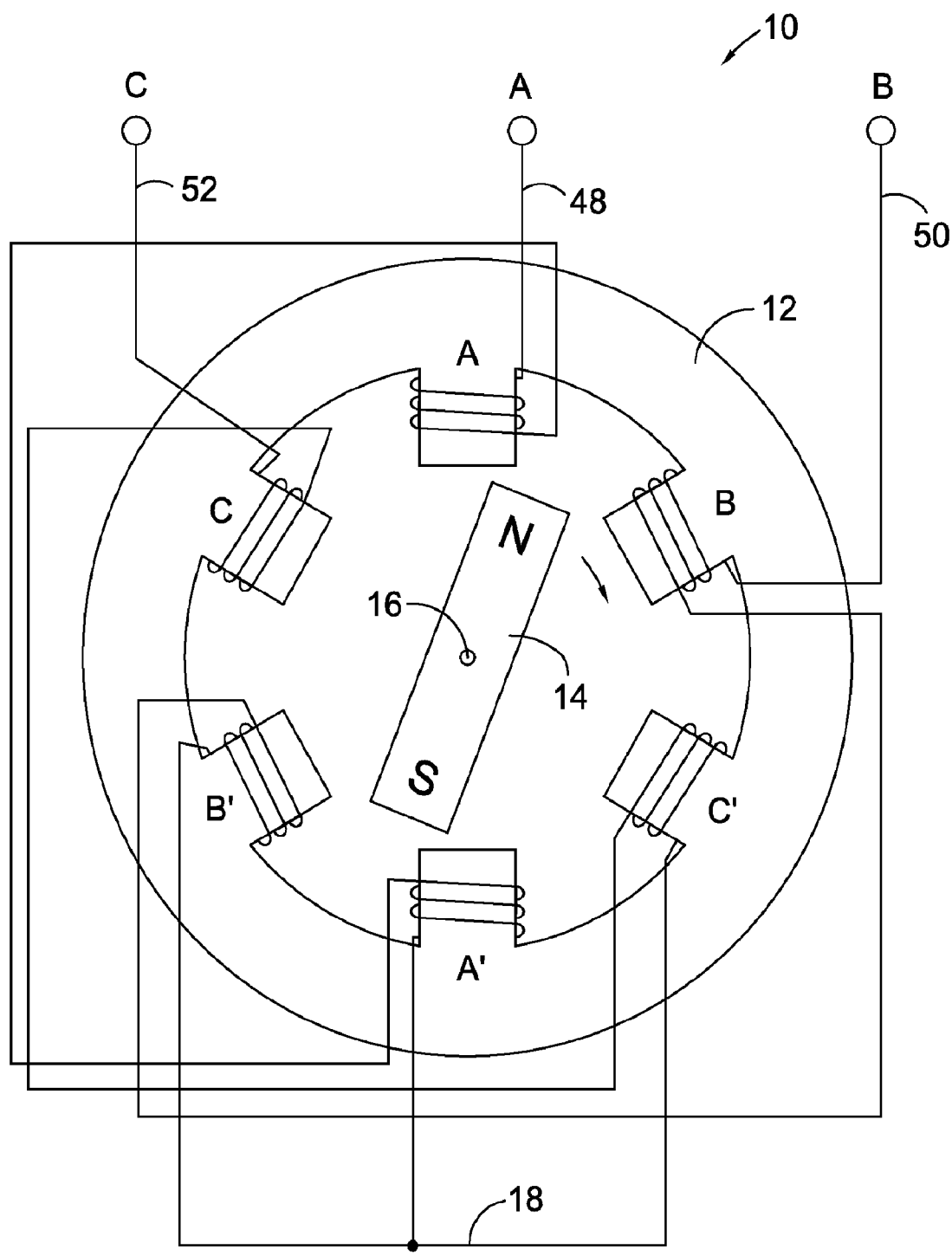
FIG. 1 is a diagrammatic illustration of a three-phase direct current brushless motor in accordance with an exemplary embodiment of the present invention.

Referring to FIG. 1, a brushless DC motor is generally indicated by reference numeral 10. Motor 10 includes three pairs of windings or coils A-A', B-B' and C-C' on a stator 12 surrounding a rotor 14. Rotor 14 is shown diagrammatically as a bar magnet having a north and a south pole and secured to a shaft 16. Each of the pairs of windings or coils A and A', B and B' and C and C' is connected in series. The coils of each pair are wound in opposite directions so that a current through the pairs of windings creates electromagnet poles on the stator 12 of opposite polarity. By creating electromagnet poles on the stator 12 that attract and/or repel those of the rotor 14, the rotor 14 may be made to rotate by successively energizing and de-energizing the phases. The free ends of coils A', B' and C' are connected together as illustrated at 18.

Figure 2:
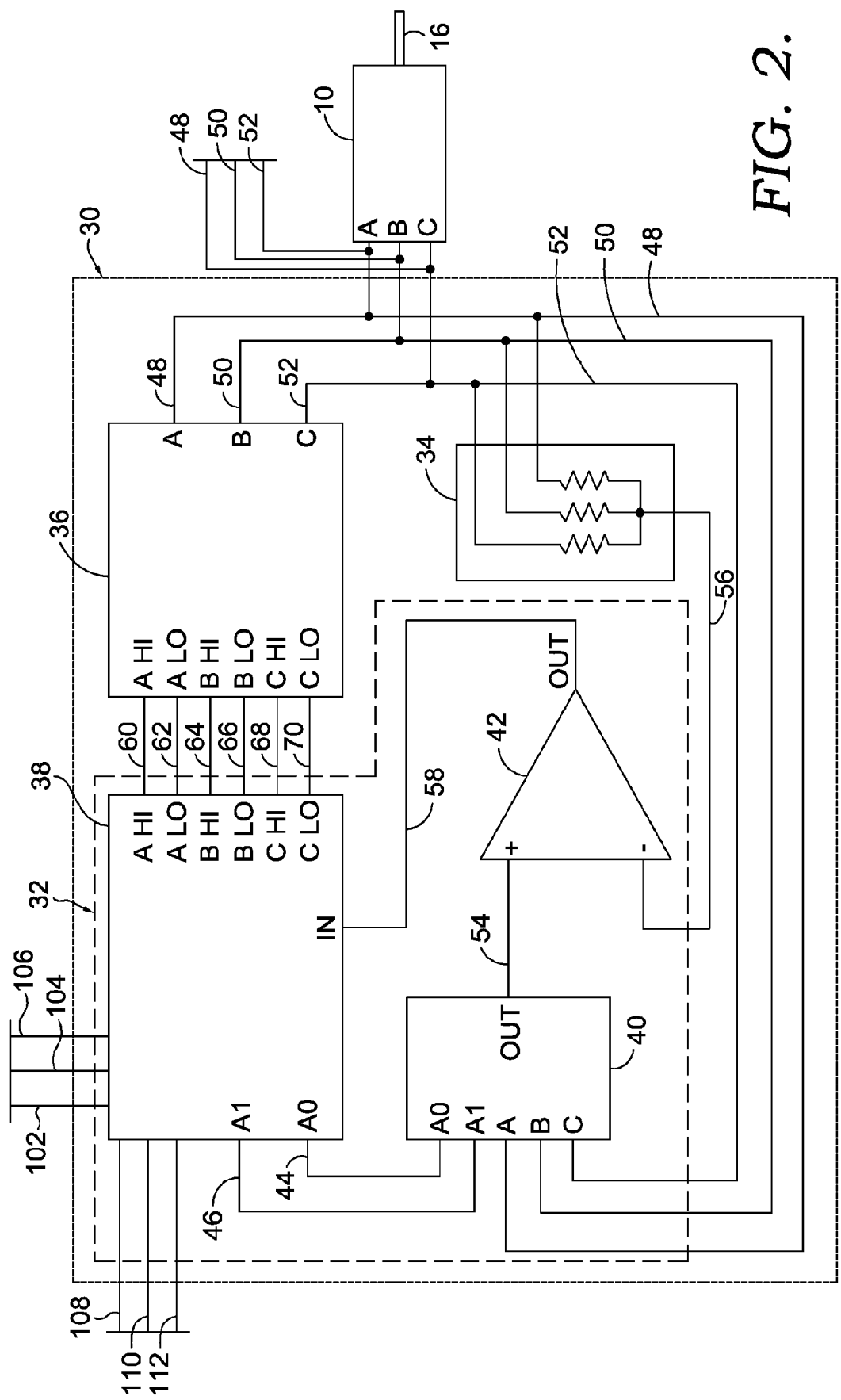
FIG. 2 is a schematic of the control circuit for the motor of FIG. 1 in accordance with an exemplary embodiment of the present invention.

Referring to FIG. 2, a control circuit for motor 10 is generally indicated by reference numeral 30. Controller 30 includes a microcontroller circuit 32, a neutral phase circuit 34 and a power stage circuit 36. Microcontroller circuit 32 includes a microprocessor 38, an analog multiplexer 40 and a comparator 42.

Microprocessor 38 controls the comparison select outputs A0 and A1 to multiplexer 40 on lines 44 and 46, respectively. Accordingly, a digital input to multiplexer 40 is provided on lines 44 and 46 to control the selection of which the phases, A, B or C, on power stage output lines 48, 50 and 52, respectively, is output on line 54.

Comparator 42 compares the multiplexer output voltage on line 54 with the output of the neutral phase circuit 34 on line 56. When the voltages are equal, an output is generated on line 58 which is input to the microprocessor 38.

Microprocessor 38 also controls the output on lines 60, 62, 64, 66, 68 and 70 which are input to the power stage circuit 36. Based on the inputs on lines 60, 62, 64, 66, 68 and 70, the power stage circuit 36 selectively controls the current and voltage for phases A, B and C on lines 48, 50 and 52, respectively.

Figure 3:
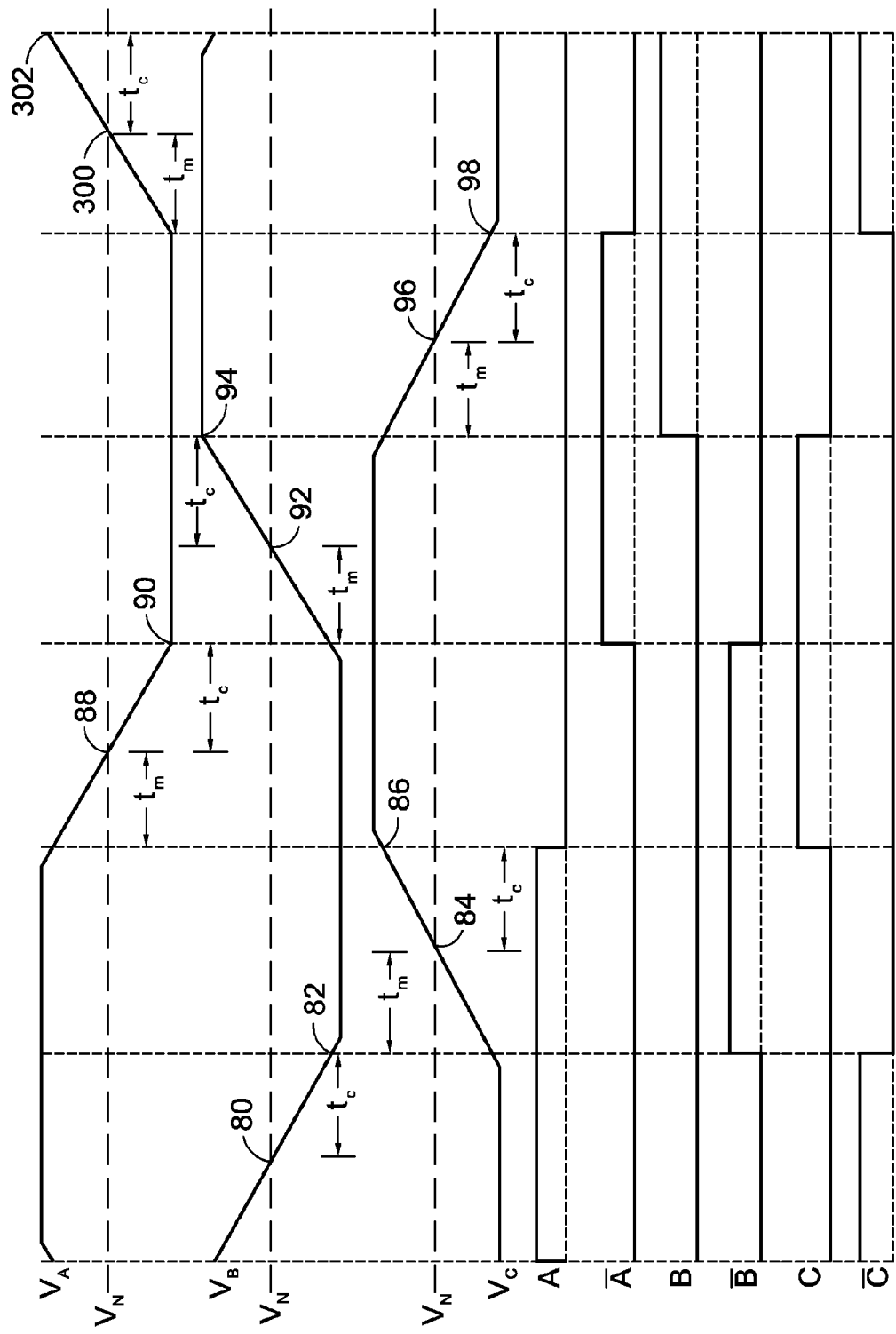
FIG. 3 is a graphical illustration of the applied and measured voltages for the windings of the motor of FIG. 1 in accordance with an exemplary embodiment of the present invention.

Referring to FIGS. 1-3, in order for the motor shaft 16 to turn in a desired direction, the phases A, B and C are activated in a specific order called the commutation sequence. As shown in FIG. 3, this sequence is $A\overline{C}$, $A\overline{B}$, $\overline{B}C$, $\overline{A}C$, $\overline{A}B$, $B\overline{C}$, and repeats thereafter.

In the first period of the sequence, microprocessor 38 outputs a signal on lines 60 and 70 to power stage circuit 36 which applies a positive voltage to phase A on line 48, and a negative voltage to phase C on line 52. As the rotor 14 turns, a voltage is induced in the phase B windings which falls as the north pole of the rotor 14 passes. The neutral voltage ($V_N$) on line 56 is compared by comparator 42 to the back EMF phase B voltage on line 50 through multiplexer 40 and output on line 54. When the voltages on lines 54 and 56 are equal, indicating a zero crossing point 80 (FIG. 3), an output on line 58 is generated and input to microprocessor 38.

Microprocessor 38 waits a predetermined period of time (discussed below) for the next commutation. At the first commutation point 82 shown in FIG. 3, microprocessor 38 outputs a signal on line 66 and removes the signal on line 70 to power stage circuit 36 which applies a negative voltage to phase B on line 50 and phase C is allowed to float. The microprocessor 38 signals multiplexer 40 on lines 44 and 46 to switch the output on line 54 to phase C on line 52.

As the rotor 14 continues to turn, a voltage is induced in the phase C windings. When the back EMF voltage on line 52 through multiplexer 40 to line 54 equals the neutral voltage on line 56 indicating a zero crossing point 84, an output is generated on line 58 from comparator 42 to microprocessor 38.

The time from commutation point 82 until zero crossing point 84 is measured ($t_m$) by microprocessor 38. The commutation time ($t_c$) is set to the measured time $t_m$ and the microprocessor 38 waits the commutation period for the next commutation. At the next commutation point 86 a signal is generated by microprocessor 38 on line 68 and removed from line 60 to power stage circuit 36, which applies a positive voltage to phase C on line 52 and removes a voltage on line 48 to allow phase A to float. The microprocessor 38 signals on lines 44 and 46 to multiplexer 40 to switch the output on line 54 to phase A on line 48.

Microprocessor 38 measures the time from commutation point 86 until the zero crossing point 88 for phase A. The commutation time is set to this measured time and the microprocessor waits the commutation time period for the next commutation. At the next commutation point 90, phase A is set to a negative voltage and phase B is allowed to float.

When the back EMF voltage on line 50 is equal to the neutral voltage on line 56, microprocessor 38 waits for the measured period of time from commutation point 90 to the zero crossing point 92 for the next commutation at point 94. At point 94, a positive voltage is applied to phase B, and phase C is allowed to float.

Microprocessor 38 measures the time from commutation point 94 until the zero crossing point 96 for phase C. The commutation time is set to this measured time and the microprocessor 38 waits the commutation time period for the next commutation. At the next commutation point 98, a negative voltage is applied to phase C and phase A is allowed to float. The back EMF voltage on line 48 is compared to the neutral voltage on line 56. Once the zero crossing point 300 for phase A is reached, the microprocessor waits the measured time period from point 98 to point 300 for the next commutation point 302.

At commutation point 302 a positive voltage is applied to phase A on line 48 and phase B is allowed to float. The cycle is then repeated. As appreciated by those skilled in the art, this control technique is one embodiment of a "high duty cycle" technique. The duty cycle for this embodiment of a high duty cycle control technique may approach 100% because the unused phase is monitored at the same time that power is applied to two other phases.

Each zero crossing event occurs sixty degrees before the rotor 14 moves to a point where the current phase activation will begin slowing down the rotor and where the next phase activation produces the maximum torque. If the microprocessor 38 waits for 100% of the measured time, the motor will be running a neutral timing. Neutral timing is generally the most efficient mode for running the motor. However, more power can be gained by waiting only a fraction of that time, which is referred to as advanced timing. If the time to commutate to the next phase is only 50% of the measured time, the timing is advanced by 15 degrees.

Figure 4:
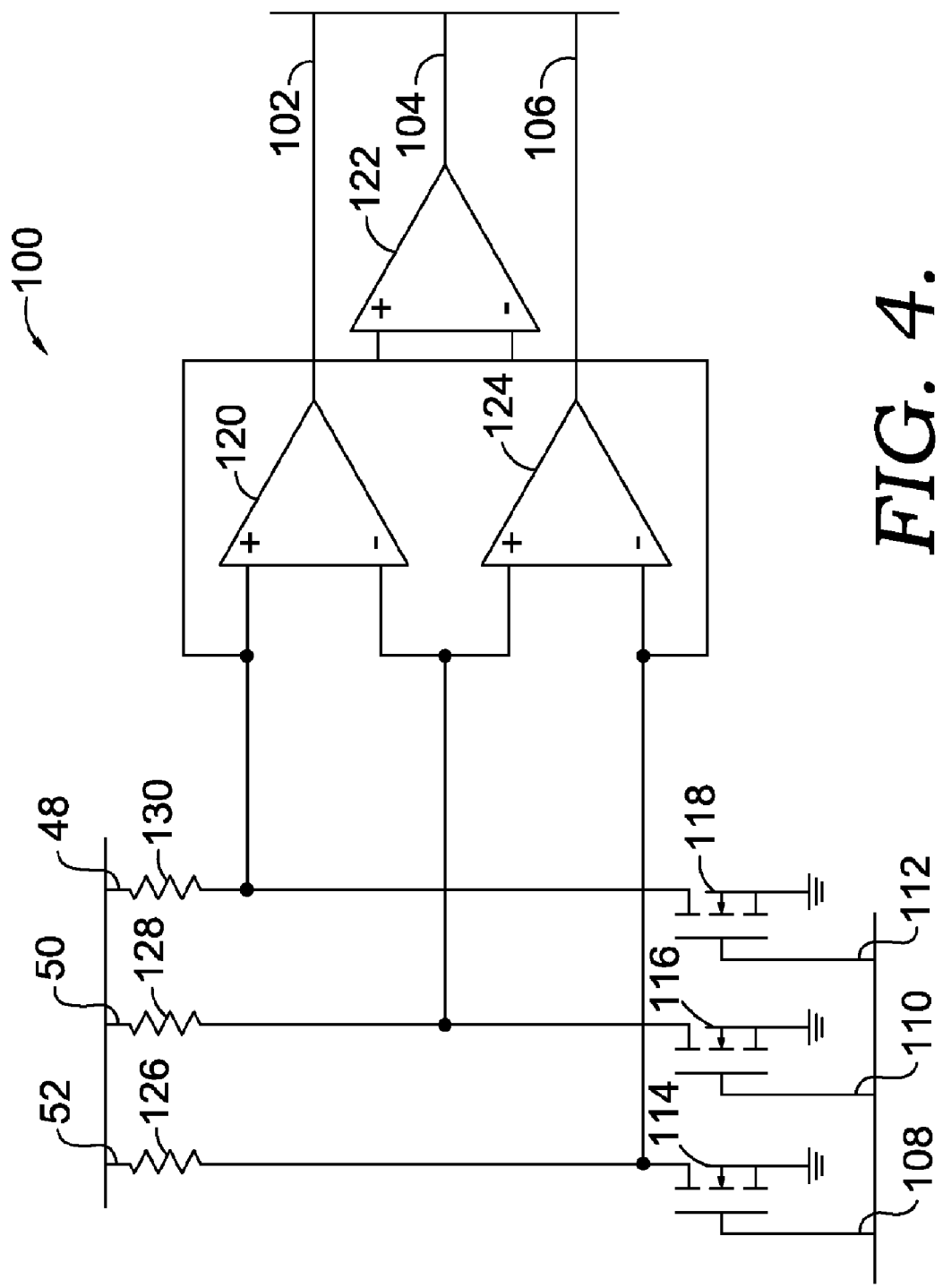
FIG. 4 is a schematic of the back EMF sensor circuit in accordance with an exemplary embodiment of the present invention.

Referring to FIGS. 2 and 4, a circuit for sensing the back EMF is generally indicated by reference number 100 (FIG. 4). The back EMF sensor 100 receives input from the microprocessor 38 on lines 108, 110 and 112. The back EMF sensor 100 monitors phases, A, B or C, on power stage output lines 48, 50 and 52, respectively. Based on these signals, a back sensor provides input to microprocessor 38 on lines 102, 104, and 106 as described in detail below.

When the comparator protection MOSFETS 114, 116, and 118 are inactive, the phase outputs 48, 50, and 52 are directly connected to comparators 120, 122, and 124 giving the highest possible signal level on lines 102, 104, and 106. The comparators 120, 122, and 124 need to be able to function with input voltages ranging from relatively small negative values, to some known positive value. This known positive voltage need not be very high depending on how this method will be used. This voltage will determine how close to the no-load Revolutions Per Minute (RPM) of the motor 10 is achievable. When a comparator 120, 122 or 124 input protection MOSFET 114, 116 or 118 is active on any particular phase, the resistor 126, 128 or 130 respectively in series with that comparator will drop the phase voltage to a level that will not damage the comparator inputs. This functionality is employed so that low voltage, high accuracy comparators can be used while employing this method to start the motor, after which a more traditional method can take over. A comparator's input is shut off whenever its respective phase voltage is above its maximum input voltage. This is likely to happen when the phase is pulled high during a Pulse Width Modulation (PWM), and when more traditional circuitry further accelerates the motor beyond the level that can be achieved using the direct sensing comparators chosen.

As those skilled in the art will understand, the commutation sequence at low commutation rates frequently operates at a duty cycle below 100%. In one embodiment, utilizing the control circuit of FIG. 2 and operating the motor of FIG. 1, voltages drawn from the commutation state are applied to two phases simultaneously, defining the on-time of a PWM pulse. During the off-time, one of the two phases remains tied to either high or low polarity, but no drive is supplied during off-time since the other phases are both left floating. In the embodiment utilizing the back EMF sensor circuit depicted in FIG. 4, the low-side phase is left connected during off-time, and the high side is pulsed high when the circuit is being driven. This embodiment has the advantage of keeping the back EMF signals centered around the grounded phase, and allow accurate measurement for low signal level comparators. Other embodiments leave the high side connected, and pulse the low side to ground. Still other embodiments pulse only one phase at a time.

As those skilled in the art will understand, a power pulse is followed by a period of transient voltage appearing on the phases of a motor resulting from current decay in the motor coil. The duration depends on a number of factors including the mutual inductance of the motor. The higher the inductance, the longer one must wait before these transients dissipate.

In some embodiments, the off-time of the pulsing duty cycle is chosen to be long enough that the transient effects from coil discharge have diminished, and have little effect. Low duty cycle implementations that operate at approximately 10% duty cycle have proven to be practical. Three phase motors have been tested that have mutual inductance such that this technique may be used with a 40% duty cycle, but lower mutual inductance motors may allow such a technique to be used at duty cycles above 50%. The relative voltages present on the phases are then measured during the off-time. For example, using the embodiment depicted in FIG. 4, microprocessor 38 utilizes lines 108, 110, and 112 simultaneously to deactivate MOSFETs 114, 116, and 118 so that the order of phase voltages is measured just prior to applying drive voltages. As those skilled in the art will appreciate, the outputs 102, 104, and 106 of the back EMF sensor 100 contain binary signals that reflect the relative levels of the voltages on phases A, B, and C at the sampling time. More specifically, output 102 is high when A>B; output 104 is high when A>C; output 106 is high when B>A. Microprocessor 38 is able to determine the order of one phase voltage relative to the other phase voltages. For example, if 102 is high and 104 is high, then A is maximum. If 102 is low and 104 is low, then A is minimum. Using 102, 104 and 106 together, the maximum phase voltage, the minimum phase voltage, and the intermediate phase voltage is determinable. The comparator setup of FIG. 4 is one of several configurations that may be used. For example, a single comparator could be multiplexed to sample the relationships that need to be determined. Likewise, as those skilled in the art will appreciate, the output from the sensor circuit 100 could have been digital levels representing raw analog voltages, and the comparisons could take place internal to microprocessor 38.

The relative voltage order is used in conjunction with a corresponding mapping to determine the phases that should be pulsed, and the polarity that should be used for pulsing. A mapping matches a phase that satisfies an ordering criterion to be pulsed with a voltage according to the determination of the microprocessor 38.

In one embodiment, utilizing the control circuit of FIG. 2 and the motor of FIG. 1, the mapping chooses phases in pairs. The phase with minimum voltage is pulsed with a corresponding polarity pulse, and the phase with maximum voltage is pulsed with a corresponding polarity pulse. The correspondence is different depending upon whether or not the microprocessor 38 decides to aid acceleration or to oppose acceleration. If the microprocessor 38 is in a mode which aids acceleration, then the correspondence is as follows: a high voltage is pulsed on the phase which was measured to be maximum, a low voltage is pulsed on the phase which was measured to be minimum, and the third phase is left floating. If the microprocessor 38 is in a mode which opposes acceleration, then the correspondence is reversed: a low voltage is pulsed on the phase which was measured to have maximum voltage, and a high voltage is pulsed on the phase which was measured to have minimum voltage, and the third phase is left floating. As those skilled in the art will appreciate, other embodiments utilize the inventive technique to advantage with other mappings that give a different correspondence between the measured order and applied voltage. For example, a single phase could be pulsed high which is determined to be maximum. Alternatively, the phase determined to be maximum could be pulsed low. Likewise, a single phase could be pulsed low after being determined to be minimum. Similarly, a single phase could be pulsed high after being determined to be minimum.

Turning now to FIG. 3, there is illustrated a waveform showing how the control circuit of FIG. 2 may be used to advantage in conjunction with the back EMF sensor circuit of FIG. 4 to provide a method of sustaining rotation of a shaft of a direct current brushless motor at low revolutions per minute. Generally, as explained above, the speed range of the circuit is adjustable based on the choice of comparators 120, 122, and 124, the mutual inductance of the application, and the range of operation. The speed is low relative to a higher speed above which a higher duty cycle method of control is utilized. One embodiment uses a high pulse of 24 volts and comparators 120, 122, and 124 (FIG. 4), which measure voltage order accurately between −0.75 volts and +4 volts. With commercially available three phase motors, and typical radio control vehicle gears, this embodiment has been effective at initiating rotation, and sustaining rotation of vehicle wheels for model vehicles at low wheel speeds at approximately 100 RPM. The general case will be considered below, and the invention will be shown to be operable in other cases also, but for the present discussion of the method it is assumed that the direction of rotation of the shaft is known, and in the desired direction.

Consider the use of this method for one embodiment beginning at instance 80 of FIG. 3. In this interval phase A is being pulsed high, and phase C is being pulsed low. For neutral timing, the next commutation state will be selected after 82 on FIG. 3, after which point phase B begins to be pulsed with a low voltage, while phase C is left floating, and phase A continues to be pulsed with a high voltage. In some embodiments, the determination of pulsing level and phase are based on the prior measurement, simply using the corresponding phase with maximum voltage pulsed high, and the corresponding minimum voltage phase pulsed low. As those skilled in the art will appreciate, other embodiments make use of signal processing techniques to base the updated commutation state on the relative voltages. Embodiments make use of techniques such as averaging results, filtering recent history, comparing a result to expected results based on prior timing, etc. Likewise, if the commutation state and direction of rotation are known, some embodiments only monitor a subset of the full complement of signals to make the commutation state change. In the present exemplary interval between 80 and 82, it is unnecessary to monitor the back EMF for phase A since the change of state will occur when the back EMF of phase B drops below the back EMF for phase C. Thus, some embodiments monitor minimum voltage alone to update commutation state. In the interval from 82 to 86, the method pulses phase B low and phase A high until it is determined that phase C voltage is greater than A, after 86. In the interval between 86 and 90, phase C is pulsed high, and phase B is pulsed low. This commutation state is terminated after 90 when it is determined that the back EMF for phase A is below the back EMF for phase B. In the interval from 90 to 94 phase C is pulsed with a high voltage, and phase A is pulsed with a low voltage. The commutation state is changed after 94 when it is determined that the back EMF in phase B has become maximum rather than the back EMF in phase C. In the interval from 94 to 98 phase B is pulsed high and phase A is pulsed low until it is determined after 98 that the back EMF on phase C has dropped below the back EMF on phase A. In the interval from 98 to 100 phase B is pulsed high and phase C is pulsed low until just after 102 when it is detected that the back EMF on phase A has become larger than the back EMF on phase B. After 102 but before the situation depicted at 82, phase A is pulsed high and phase C is pulsed low, bringing the control cycle back to the beginning state that we discussed beginning at 80.

As those skilled in the art will appreciate, other embodiments make use of the invention while utilizing the technique for the particular features of the motor or controller selected. Some embodiments do not pulse both phases simultaneously, but only pulse a single phase. Some embodiments use a fixed duty cycle. Other embodiments perform additional samplings of back EMF during the off-time of the PWM waveform, and adjust the PWM period based on the signals measured. For example, the characteristics of the transient are monitored until the signals become consistent and regular. A long period of stable signals results in the PWM period being shortened.

Directly sensing the phase crossing point has several advantages over traditional zero-crossing point techniques. The comparators can generate valid signals at lower back EMF voltages over the full range, as opposed to comparing a single back EMF voltage to the neutral point. In addition, this technique is particularly advantageous at low RPM because the commutation point is directly measured as opposed to using the zero-crossing point in which there is a pre-calculated delay between the measured event and the desired commutation point. Because this point is directly measured and stable, near neutral timing can be achieved even when the motor RPM is unknown and unstable. As those skilled in the art will appreciate, the technique of the present invention is particularly advantageous when applied to low speed variable motor applications such as turning the wheels of a vehicle at low speed, controlling speed of model vehicles or propellers at low speed, controlling low rotational speeds of a screw driver or drill, and controlling the speed of a pump.

Still with reference to FIG. 3, consider the application of the invention to perform a method of accelerating rotation of the shaft of a direct current brushless motor from rest through transition to a high duty cycle commutation sequence. This encompasses the situation where the motor shaft position and rotation are originally unknown. As is well known in the art, there are many techniques available for determining the initial position or direction of the rotor. Any of these are amenable to combination with the present invention. One embodiment of the present invention simply applies a first set of voltages drawn from a commutation sequence, and begins the commutation sequence, accelerating the rotor in an unknown direction, and then makes subsequent measurements to determines direction of rotation from historical data. For example, consider an embodiment wherein one or more pulses are applied, and it is determined that phase A has maximum voltage and phase B has minimum voltage. The technique continues to pulse phase A high and phase B low and monitors both maximum and minimum voltage during each off-time of a pulsing sequence. If the direction of rotation is correct, then the next commutation state encountered will be chosen when voltage C becomes maximum at a point depicted by 86 of FIG. 3. In this case, the pulse sequence continues with the same correspondence, continuing to pulse B low, but pulsing C high after it is detected that C is maximum. If, however, the next change of order encountered is that phase C becomes the minimum and phase A is the maximum, then microprocessor 38 determines that the direction of rotation is reversed from the favored direction. In this case, microprocessor 38 changes the correspondence to effect negative acceleration by pulsing phase A low and phase C high. The correspondence remains reversed until historical data indicates that correct direction rotation has been achieved, for example, that the back EMF pattern begins changing in the correct direction. After this, the microprocessor 38 reverts to the correct direction correspondence. For example, if the next change of measured order occurs when phase A remains maximum but phase B becomes minimum, then phase B is pulsed low and phase A is pulsed high. Once the direction of rotation is established, the invention may be used as described above to control the speed of the rotating shaft.

As will be appreciated by those skilled in the art, other embodiments make use of similar techniques of employing historical data to determine that the direction of rotation is reversed. Some embodiments monitor the analog signal levels of back EMF prior to comparison in comparators 120, 122, or 124, and measure, for example, the slope of the back EMF on the floating phase. Some embodiments measure the time of the zero crossing on the floating phase and use this in conjunction with the last detected order change to determine direction of rotation. As the rotation of the shaft speeds up, the back EMF signature becomes stronger, and the commutation sequence increases in speed. Some embodiments transition from a pulsed technique to a high duty cycle technique. This may be advantageous when the comparators 120, 122, and 124 begin to saturate, or when a higher torque is desirable. Many such high duty cycle techniques are compatible with the present invention, but the technique described herein is particularly advantageous. This technique monitors the zero-crossing point of the floating phase and measures a time from a first commutation event to a zero crossing event. It then utilizes this time measurement to determine a second commutation time after a second zero crossing event. As appreciated by those skilled in the art, the transition from one technique of commutation to another may be made by a number of methods. Some embodiments monitor error mechanisms for each method, attempting to perform both, and the best method is chosen for control. Some embodiments make use of commutation speed, transitioning to the high duty cycle method above a certain speed. Some embodiments monitor maximum back EMF level, using the high duty cycle method when the back EMF is above a certain level.

It is to be understood that while certain forms of this invention have been illustrated and described, it is not limited thereto, except insofar as such limitations are present in the claims.

What is claimed is:

1. A method of accelerating rotation of a shaft of a direct current multi-phase brushless motor comprising:
    generating a first power pulse on a first phase of a brushless direct current motor, wherein said first power pulse effects rotation of a rotor;
    determining, after a first time period following the end of said first power pulse, an order with respect to voltage of at least a second phase of said brushless direct current motor relative to the voltage of one or more other phases; and
    generating a second power pulse on said second phase, wherein the polarity of said second power pulse corresponds to the determined relative order.

2. A method of accelerating rotation of a shaft of a direct current multi-phase brushless motor comprising:
    generating a first power pulse on a first phase of a brushless direct current motor;
    determining, after a first time period following the end of said first power pulse, an order with respect to voltage of at least a second phase of said brushless direct current motor relative to the voltage of one or more other phases; and
    generating a second power pulse on said second phase, wherein the polarity of said second power pulse corresponds to the determined relative order, and wherein said second phase is determined to have maximum voltage and the corresponding polarity is high.

3. A method of accelerating rotation of a shaft of a direct current multi-phase brushless motor comprising:
    generating a first power pulse on a first phase of a brushless direct current motor;
    determining, after a first time period following the end of said first power pulse, an order with respect to voltage of at least a second phase of said brushless direct current motor relative to the voltage of one or more other phases; and
    generating a second power pulse on said second phase, wherein the polarity of said second power pulse corresponds to the determined relative order, and wherein said second phase is determined to have minimum voltage and the corresponding polarity is low.

4. The method of claim 1 further comprising determining after said first time period an order with respect to voltage of a third phase of said brushless direct current motor relative to the voltages of one or more other phases.

5. A method of accelerating rotation of a shaft of a direct current multi-phase brushless motor comprising:
    generating a first power pulse on a first phase of a brushless direct current motor;
    determining, after a first time period following the end of said first power pulse, an order with respect to voltage of at least a second phase of said brushless direct current motor relative to the voltage of one or more other phases;
    generating a second power pulse on said second phase, wherein the polarity of said second power pulse corresponds to the determined relative order; and
    determining after said first time period an order with respect to voltage of a third phase of said brushless direct current motor relative to the voltages of one or more other phases,
    wherein said generating a first power pulse occurs during the generation of a third power pulse on a fourth phase of said brushless direct current motor;
    and wherein said generating a second power pulse occurs during the generation of a fourth power pulse on said third phase,
    wherein the polarity of said fourth power pulse corresponds to said determined relative order of voltage on said third phase.

6. The method of claim 5 further comprising determining direction of rotation from historical data.

7. The method of claim 6 further comprising effecting negative acceleration by setting the current commutation to pulse the phase with the greatest voltage low and the phase with the lowest voltage high if it is determined that the direction of acceleration is reverse.

8. The method of claim 1 wherein the rotation of said motor shaft effects rotation of an item selected from the group consisting of a passenger vehicle wheel, a radio control vehicle wheel, a drill bit, a propeller, a pump, and a screw driver.

9. One or more computer-readable media having computer-useable instructions embodied thereon to perform a method of accelerating rotation of a shaft of a direct current multi-phase brushless motor comprising:
    generating a first power pulse on a first phase of a brushless direct current motor, wherein said first power pulse effects rotation of a rotor;
    determining, after a first time period following the end of said first power pulse, an order with respect to voltage of at least a second phase of said brushless direct current motor relative to the voltage of one or more other phases; and
    generating a second power pulse on said second phase, wherein the polarity of said second power pulse corresponds to the determined relative order.

* * * * *